United States Patent [19]

Priser et al.

[11] Patent Number: 5,115,633
[45] Date of Patent: May 26, 1992

[54] COMPACT HIGH-ENERGY AUXILIARY POWER METHOD AND MEANS

[75] Inventors: David B. Priser, Edgewood; Robert L. Dow, La Plata, both of Md.

[73] Assignee: The United States of America as represented by the Secretary of the Army, Washington, D.C.

[21] Appl. No.: 702,298

[22] Filed: Dec. 6, 1984

[51] Int. Cl.$^5$ ............................................. F02C 9/00
[52] U.S. Cl. ................... 60/39.01; 60/39.27; 60/606; 60/624; 60/735; 102/334
[58] Field of Search ................ 60/39.01, 39.27, 606, 60/624, 735; 102/334; 252/305; 343/18 E

[56] References Cited

U.S. PATENT DOCUMENTS

| | | | |
|---|---|---|---|
| 3,975,292 | 8/1976 | Shaffer | 252/305 |
| 4,100,102 | 7/1978 | Shaffer | 252/305 |
| 4,439,341 | 3/1984 | Swiatosz | 252/305 |
| 4,459,219 | 7/1984 | Kiley | 252/305 |
| 4,484,195 | 11/1984 | Shaffer | 252/305 |

*Primary Examiner*—Donald P. Walsh
*Attorney, Agent, or Firm*—Anthony T. Lane; Edward Goldberg; Edward F. Costigan

[57] ABSTRACT

A low-cost, lightweight mobile gas turbine capable of rotating in excess of one hundred thousand RPM is coupled to a centrifugal air compressor which supplies high volume airflow to a diesel fueled combustion chamber for supplying hot gas to the turbine. Three energy outputs are obtained in the form of pressurized airflow, hot gas flow and large volumes of directed ambient air. The hardware components are essentially state-of-the-art, but their combination for use in multi-purpose military combat operations has not heretofore been known. Such uses include smoke generation, dissemination of infre-red and radar absorbant clouds, decontamination of large masses, hot water supply and air pressure source for mechanics tool operation.

8 Claims, 1 Drawing Sheet

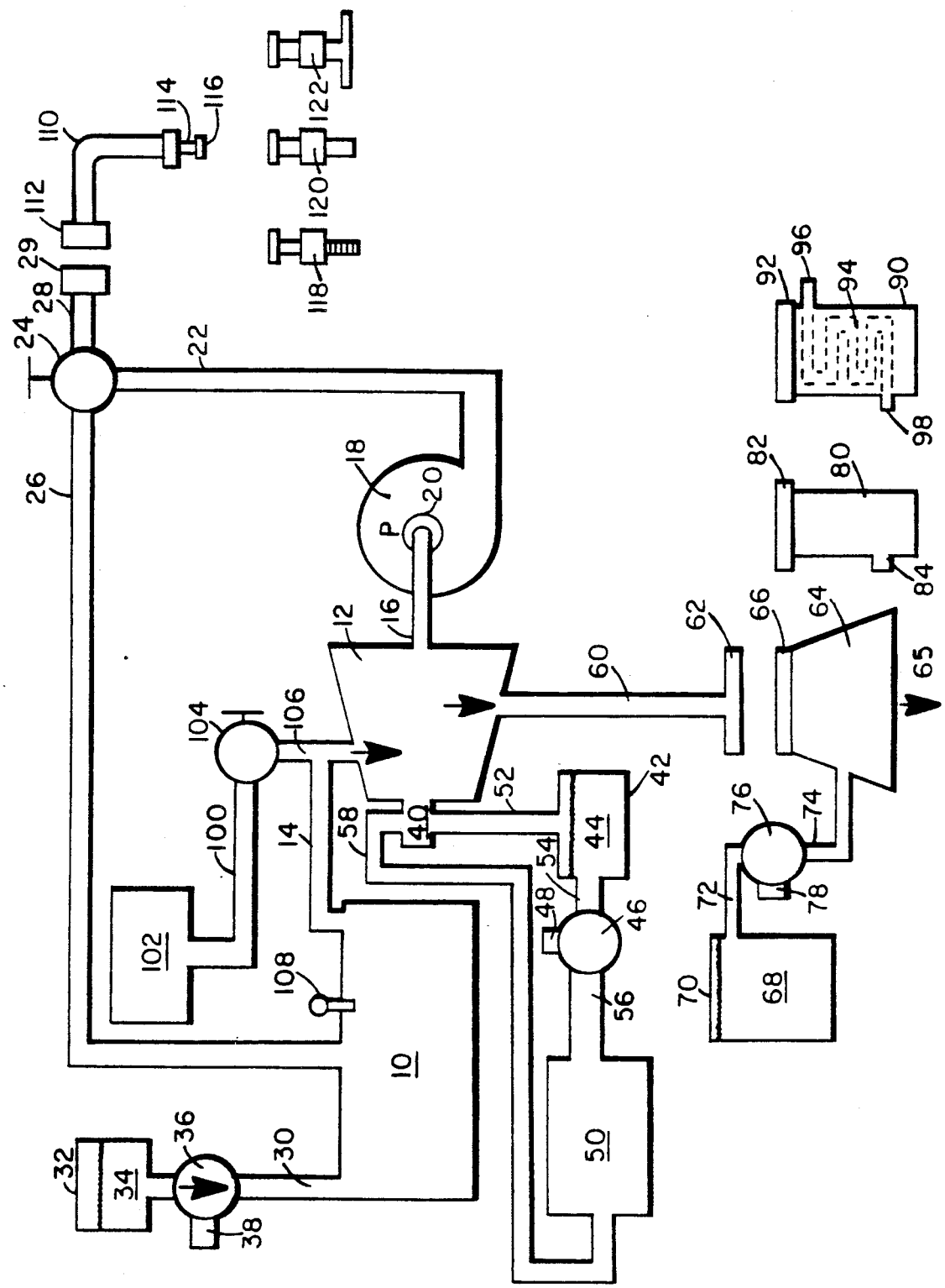

COMPACT HIGH-ENERGY AUXILIARY POWER METHOD AND MEANS

GOVERNMENTAL INTEREST

The invention described herein may be manufactured, used and licensed by or for the Government for governmental purposes without the payment to us of any royalties thereon.

BACKGROUND OF THE INVENTION

The invention relates to a small portable power converter adaptable to multiple battlefield operational modes for selection and use in accordance with various tactical needs as they arise in combat. One well-known need familiar to every combat soldier is to mask troop movements on the battlefield as well as conceal such critical combat items as tanks, artillery pieces, command posts, armored carriers, communication centers and other equipment common to ground warfare. Similarly, the Navy has a need to screen its warships at sea against observation or pinpoint targeting by enemy missiles or the like. The Air Force combat need is for screening entire airfields against attack by enemy projectiles, both to confuse enemy observers and to blind incoming missiles or the like to prevent destruction of its aircraft on the ground.

These massive screening requirements are extremely difficult to achieve using such devices as smoke-generators known to the prior art. The Army has not developed and fielded any new smoke-generators since the M3A3 was designed about 1958. The M3A3 weighs around 167 pounds and employs a pulse-jet engine to create and disperse smoke. Its use is limited to visual obscuration since it is not adaptable for use with anything other than hydrocarbon liquid oils used to create smoke. Solid particle agents which can blind enemy observation and target-seeking devices involving radar, infra-red or laser technology cannot be disseminated by the M3A3 smoke-generator. Also it is poorly adapted to screen the Army's newest tank, the M1 which travels faster than tanks of the past.

Another problem with prior smoke-generators is that turbines have not been used until very recently. When turbines or conventional auxiliary power turbines are used for smoke generation, they are very costly and need to be mounted on fixed or stationary platforms rather than on vehicles or other mobile units. This is because turbines generally are precision made devices characterized by very close tolerances and clearances between stationary and moving vanes. They are very sensitive to vibration due to their close tolerances and narrow clearances, hence must be shock-mounted even on a stationary base. Auxiliary power turbines used on aircraft are generally of low weight and have different vibration patterns, usually high frequency and low amplitude vibrations such as encountered in supersonic aircraft characterized by relatively straight trajectories or flight paths and an absence of bumps or sudden changes of direction. Ground vehicles have low frequency but high amplitude vibrations such as jeeps driving over bumpy or rough terrain. Aircraft turbines cannot survive the pounding which they would have to endure if mounted on a jeep, for example. Also, maintenance costs are very high with turbines, particularly due to high labor cost associated with expensive precision-made replacement parts and the use of turbine mechanics. Moreover, the size of aircraft turbines is an inverse function of the turbine speed squared. To double the rotational speed of a turbine, its size would have to be reduced to approximately ¼ of its volume at the old speed. Aircraft turbines, which are very large, typically rotate between 55 and 60 thousand RPM. They are controlled by their rotating speed to a relatively narrow operating range. Although they are not well suited for disseminating smoke, some attempts have been made to adapt them for this purpose because of the large volume and relatively high velocity of exhaust gas associated with their operation. One model, presently under development, of a smoke-generator using a turbine of the foregoing type weighs 1400 pounds, requiring a ¾ ton trailer to haul it and costs $70,000 without the trailer. Of this amount, $30,000 comprises equipment and components separate from the turbine which are necessary to operate it. Smoke generation is the only operational capability offered by this item, and it produces only one-third of the smoke generation rate achieved by the invention in this case costing about $5,000.

The Navy is interested in large smoke screening operations such as to obscure an entire aircraft carrier traveling in a 50 knot wind. This would represent 25 knots forward speed of the carrier plus a 25 knot headwind such as would be expected during flight operations when the carrier must sail directly into the wind in order to launch airplanes from its flight deck. Although flight operations must be interrupted when enemy incoming missiles are detected, Navy doctrine does not permit radical direction changes from the headwind orientation. This requires a massive smoke output for screening purposes. The Navy has an additional problem due to the particular vulnerability of turbines to salt, even atmospheric salt common to the open sea which are ingested into the turbines. Turbines suffer rapid structural deterioration and breakdown from any contact with salt in any amount during turbine operation characterized by high temperatures. Due to this particular susceptibility for rapid and precipitous damage, expensive alloys and surface treatments are necessary to enable a turbine for use at sea to withstand salt corrosion. Such turbines are said to be "marinized" for Navy use. An aircraft turbine, if marinized for example, costs $200,000 more than the same turbine not marinized.

In addition to the foregoing deficiencies, smoke-generators known to the prior art typically require long start up times and complex procedures for starting such as manually priming the energy source, hand cranking of the turbine to bring it up to sufficient rotational speed and continuous control to balance essential starting parameters by the operator. Such control may involve several different inputs to compensate for speed, fuel, air supply and feeding rate of smoke agents. Moreover, the massive bulk and weight of such units and their sensitivity to vibration and other factors limit their use to slow moving or stationary bases. In addition, such units lack versatility in that they are limited to one particular operational use or purpose, namely, generating smoke. Where the enemy battlefield threat consists of infra-red and laser aiming or target acquisition devices, it is necessary to use entirely different materials to screen tanks, grounded aircraft or Navy vessels. When a combat vehicle is moving at high speed over land surfaces or through the water, the screening source is required to move in advance of the screened object to maintain adequate coverage thereof. Prior art smoke-generators cannot be vehicle mounted and move as rapidly over terrain as the M-1 tank travels. This is because they cannot withstand jolting and because the smoke output of such devices is so limited that it will not generate a sufficiently heavy screen when traveling at high speed to obscure the M-1 tank which is quite large and not easily camouflaged.

BRIEF DESCRIPTION OF THE INVENTION

The invention consists of a small portable power unit which is low in cost, small in size, and versatile in use, being adapted for mounting on military vehicles such as jeeps, tanks, trucks or the like. The power unit essentially consists of a combustion chamber for generating hot gas which is supplied to an adjoining turbine rotatable at high speed, the mechanical output of which drives a rotary single stage centrifugal air compressor which feeds pressurized air into the combustion chamber. A plurality of different exhaust passages are removably attachable to the hot turbine exhaust, each section functioning for a different purpose according to battlefield needs. One section is used for generating smoke, another for decontaminating battlefield equipment which has been subjected to enemy chemical agents, another section for heating water and another for disseminating powdered particulates and the like. The unit supplies heat at a rate of 900,000 BTU s per hour, and generates smoke at three times the volume of the existing M3A3 smoke-generator used by the Army since 1958. The unit is impervious to such external or environmental conditions as external shock loads, violent or abrupt vibrations, moisture, dust, salt air, equatorial heat or arctic cold. It is started by applying engine exhaust gas from the vehicle upon which the inventive structure is mounted whereby such gas causes the turbine to rotate up to 15-20% of its operational speed, after which combustion is initiated. The invention is lighter in weight than prior art generators because it requires fewer support systems. Thus, no batteries, electric starters, generators, gearboxes, special mounting brackets or the like are required. The outputs of the inventive unit include a high pressure, hot water washing capability, a high volume low pressure compressed air source such as for operation of shop tools and the like, a high volume aimable flow of cool ambient air, a fluidizer that can make stable aerosols, a hot air directed decontamination jet stream, a cold air decontamination stream, or a vehicle cleaning device, in addition to a smoke generator and disseminator of other obscurants or chemical agents.

BRIEF DESCRIPTION OF THE DRAWINGS

The invention may be seen from the accompanying drawing showing a schematic representation of its various components in operational relationship.

DESCRIPTION OF THE PREFERRED EMBODIMENT

Referring to the drawing figure, reference numeral 10 denotes a combustion chamber into which air and fuel are force -fed continuously for the generation of hot gas which is fed into turbine 12 through a suitable passage or duct 14. Components 10, 12 and 14 are known in the prior art., however, their combination with the other elements depicted in the drawing has not heretofore been used for the purposes and objectives discussed hereinabove. Turbine 12 is relatively small, being of a size and type commonly associated with "turbocharged" diesel engines used on huge trucks of the tractor-trailer type for cross-country hauling. Turbine 12 includes a plurality of radially directed blades symmetrically arranged about a center rotational axis in the manner associated with turbines generally. A mechanical output shaft 16 is connected to turbine 12 and rotates to apply rotating torque to single stage centrifugal air compressor 18 into which ambient atmosphere enters through inlet 20 and is expelled at high pressure through exit 22. Exit 22 comprises a tube or pipe operatively associated with variable adjustment valve 24 which includes manual means for variably adjusting the proportion of air flow from exit 22 in two directions. Valve 24 may be positioned so that all of the exit air from compressor 18 is supplied through suitable passage means 26 into combustion means 10. By varying the valve adjustment, some percentage of the air from passage 22 may be allowed to exit through duct or other suitable exit means 28 so as to permit, for example, 70% of the compressed air from exit 22 to feed into combustion chamber 10 while 30% exits through passage 28. Exit 28 has a flange 29 or other suitable attaching means for connection with air passage 28 to permit operation of air-powered mechanics tools or the like.

Fuel is fed into combustion chamber 10 through one or more supply lines 30 from a tank or reservoir 32. When the inventive structure shown by the drawing figure is mounted on a diesel-powered vehicle, for example, diesel fuel may be fed through passage 30 directly from the vehicle fuel tank. Alternatively, any hydrocarbon type fuel may be used in combustion chamber 10 such as jet-engine fuels associated with aircraft use, and which may be pumped directly from a 55-gallon shipping or storage drum. In any case, the fuel 34 in container 32 is connected by suitable passage means into a pump 36 which functions to force-feed the fuel through passage 30 at sufficient pressure to enter chamber 10 during the combustion process. Pump 36 may be powered by any suitable means such as electric motor 38 which may operate off the vehicle electrical system upon which the inventive structure is carried.

Due to its relatively small size, turbine 12 rotates at high speed such as 100,000 RPM or more. To assure its continuous operation and extend its useful service life, the center journal upon which turbine 12 is mounted for rotation, and designated by reference numeral 40 in the drawing, is provided with independent lubrication means comprising a sump 42 containing lubricating oil 44, oil pump 46 driven by electric motor 48, and a heat exchange 50, each of these items being interconnected by suitable passages 54, 56 and 58, with each other and with bearing 40 as suggested in the drawing. Sump 42 may advantageously take the form of a flat rectangular box such as to form a base upon which all the other components shown in the drawing are supported.

In the manner typical of all conventional single-stage turbines, turbine 12 has a stationary housing substantially surrounding the rotational element of the turbine and into which hot gas at high temperature and pressure is supplied through passages 14 or 106. Turbine 12 is further provided with an exit 60 for exhausting the hot gas therefrom after it has impacted the turbine rotating element to cause its rotation. Exit 60 is provided with suitable attaching means such as flange 62 which is adapted for engagement in firm fixed relationship with a plurality of other flanges or appropriate attachment means so as to affix different exhaust passage components or elements successively thereto according to tactical need under field conditions. For example, a battlefield attachment comprising a generally conical or divergent diffuser section 64 has an attachment flange 66 formed thereon to secure the attachment to flange 62 in operative relationship therewith using nuts and bolts or any number of standard V band quick attachment clamps or the like. Attachment 64 functions essentially as a diffuser through which hot exhaust gas from turbine outlet 60 travels very rapidly as it entrains vaporized oil to create a persistent heavy fog of minute droplets which is dispersed over a substantial area during operation of the structure shown in the drawing. A supply of fog oil 68 from a container 70 is fed by suitable passages 72 and 74 through a pump 76 driven by an electric motor 78 into diffuser section 64. Fluid 68 may comprise diesel fuel or any of numerous well known hydrocarbon type or other oils which produce fog when condensed from a hot gas vapor such as produced within diffuser 64. The sloping sidewalls and conical shape of diffuser 64 cause dispersion of smoke in a substantially uniform directional pattern suggested by arrow 65.

Alternatively, battlefield attachment 80 having flange 82 formed thereon and inlet means 84 may be used for the dissemination of solid materials in fine particulate form or comminuted materials such as powders to absorb radar signals and the like. These materials may be gravity-fed from a hopper (not shown) into inlet 84 and entrained by the exit gas flow from outlet 60 through elongate section 80.

A third selectively attachable exhaust passage means 90 is a heat exchanger for heating fluids. Illustratively, flange 92 can be releasably secured to flange 62 whereby hot exhaust gas through exit 60 will flow over a serpentine coil 94 through which water continuously flows from inlet 96 to exit 98.

In starting turbine 12, which is the primary operational factor in starting the system, the engine exhaust from the vehicle upon which the system is mounted may be used. Thus, the normal engine exhaust pipe 100 from engine 102 mounted in the carrier vehicle is provided with a selector valve 104 which may be opened to admit engine exhaust into turbine 12 through passage or duct 106 which interacts with duct 14 as seen in the drawing figure. The engine 102 may be either gasoline or diesel fueled. The exhaust is sufficient to start the turbine 12 rotating up to 15 or 20 percent of its normal operational speed, whereby air compressor 18 begins to supply pressurized air to combustion chamber 10 at a rate sufficient to support combustion therein. The vehicular electrical system, which includes a 24-volt DC battery system is use to operate electric motors 38, 48 and 78, as well as to create a spark in standard turbine spark plug 108 mounted in chamber 10 and used only to initiate combustion, after which the combustion process, being continuous, is self-sustaining. There is no extended time required in starting the system, since the turbine 12 has been found through actual use to reach 20% of its normal rotational speed in as little as five seconds from a standing start. This means that the system shown in the drawing figure can begin creating an effective screen of smoke or other obscurants in five seconds from start. Also. the system requires no cooldown period after operation, but can be restarted immediately after shut-down.

In addition to the mechanical output of turbine 12 represented by rotating shaft 16 which turns compressor 18, and hot gas output from exit 60, the system shown in the drawing includes a pressurized steady flow of air from exit 28. This air may be used in field maintenance shops to operate tools for vehicular repairs, such as wrenches, grinding wheels, sanders or the like. Alternatively, this air may be used for rapid inflation of collapsible fabric shelters for troop protection from incoming toxic biological or chemical warfare attacks. Since the system can supply air immediately when the system is started, and the starting procedure is completed in five seconds, this is a very valuable lifesaving feature. The output of high-pressure air is also useful in decontaminating tanks, clothing, weapons, ammunition and other combat materiel after they have suffered attacks from enemy chemical or biological weapons. This objective is also served by the hot gas from turbine exit 60 used alone, or by high pressure hot water obtained from exhaust passage 90. When hot gas is used, exhaust passage 110 having attachment flange 112 is used. Passage 110 is a flexible metallic duct or composition rubber hose having a nozzle 114 thereon for directing hot gas against surfaces to be cleaned or dried after washing toxic agents therefrom. Nozzle 114 also includes suitable attaching means such as a flange 116 for connecting the air hose to such devices as a drill 118, a wrench 120, or a grinder-polisher wheel 112.

Air from exit 28 may also be used to deploy such obscurant materials as may be sensitive to heat or rendered less effective by use of hot exhaust gas through turbine exit 60. Of particular note is the use of high-pressure air from exit 28 to disperse a continuous cloud of sand or dust to conceal targets from enemy visual observation and also from laser devices which depend upon laser beams for ranging and for directional pinpointing of incoming missiles or the like. Toward this end, high pressure air from exit 28 may be directed by hose 110 and nozzle 114 toward the ground surface when the vehicle carrying the inventive structure is driven across the desert. Surface dust and loose sand from the desert floor will be blown upwardly through deflection of the air jet from nozzle 114 to form a continuous cloud which will obscure targets against pin point sighting by enemy laser devices. Conventional ejectors may be used in place of nozzle 114 to augment the air flow from Exit 28 and create added turbulence whereby dust and sand become aerosolized by entraining the dust particles and disperseing them into a large plume or cloud. Alternatively, the ejector may be aimed toward a track or wheel on the supporting vehicle to aerosolize the dust stirred up or agitated by passage of the track or tire on such vehicle.

Because the inventive power system is vehicle-mounted, it requires no batteries, electric starters, generators, gear boxes, special mounting brackets, or dedicated single-purpose trailers. All of its incidental needs for external power are met by vehicular components, and the vehicle may still be used to carry personnel, weapons or supplies The starting procedure is very simple, involving only two actions and no difficult balancing of parameters. A simple two-position valve 104 in the vehicle exhaust pipe is turned so as to direct the total exhaust flow into turbine 12. When the turbine speed reaches 15 or 20 percent of its normal speed, a automatic switch thrown to activate spark plug 108, and pumps 38, 48 and 78. No other starting procedure is known which uses only vehicle exhaust gas and becomes fully operational in as little as five seconds. No other smoke generator is known to offer the alternative of hot gas or ambient air dissemination for use with obscuring agents, many of which can be dispersed only at ambient air temperatures or which break down chemically or melt under the temperatures associated with hot exhaust gas. No other smoke generator can simultaneously obscure both laser and IR or radar-aiming devices or signals such as by concurrent use of both diffuser hot gas exhaust section 64 and air nozzle 114 on outlet 28 to blow dust.

The exhaust gas temperature from exit 60 on the inventive system can be adjusted hotter or cooler by varying the proportion of air flow to chamber 10 by valve 24. The inventive system requires no built-in fuel tanks, built-in fog oil tanks, no specialized training, and no special maintenance tooling or equipment. The system can feed directly from 55 gallon barrels or 5 gallon jeep fuel cans. The components on the inventive system are all essentially state-of-the-art items, but in a new combination for a new purpose. Also, the vehicle carrying the smoke generator can return enemy fire by carrying its own weapons and crew.

The foregoing disclosure and drawings are merely illustrative of the principles of this invention and are not to be interpreted in a limiting sense. We wish it to be understood that we do not desire to be limited to the exact details of construction shown and described because obvious modifications will occur to a person skilled in the art.

We claim:

1. A low-cost, lightweight, compact, vehicle-mounted auxiliary power system for multiple-purpose battlefield uses, comprising:

hot gas operated turbine means having a gas inlet passage and an exhaust gas outlet combustion means connected to said hot gas operated turbine means by said gas inlet passage for generating a continuous flow of hot gas operated turbine means through said gas inlet passage, and air compression means mechanically connected to said hot gas operated turbine means for supplying a continuous stream of pressurized air to said combustion means to support combustion therein, said air compression means including selective means for diverting a portion of said continuous stream of pressurized air away from said combustion means.

2. A low-cost, lightweight, compact, vehicle-mounted auxiliary power system for multiple-purpose battlefield uses, comprising:

hot gas operated turbine means having a gas inlet passage and an exhaust gas outlet, combustion means connected to said hot gas turbine means by said gas inlet passage for generating a continuous flow of hot gas to said hot gas turbine means through said gas inlet passage, rotatable air compression means connected to said hot gas operated turbine means and rotatable therewith for supplying a continuous stream of pressurized air to said combustion means to support combustion therein, and selectively attachable exhaust passage means having releasable attaching means for securing said exhaust passage means to said exhaust gas outlet, said exhaust passage means including entrainment means for entraining obscurant agents in exhaust gas from said exhaust gas outlet on said hot gas turbine means, and said exhaust passage means further includes dispersion means on said exhaust passage for dispersing said entrained obscurant agents in a uniform directional pattern to screen moving objects from enemy view during military battlefield operations.

3. The structure in claim 2 further including:

said gas inlet on said hot gas turbine means is provided with duct means for selectively connecting said gas inlet with exhaust gas from an external source so as to initiate operation of said hot gas operated turbine means.

4. The structure in claim 2 wherein:

said exhaust passage means comprises a diffuser into which fluid smoke-producing agents may be fed for said entrainment to produce visual obscuration.

5. The structure in claim 2, wherein:

said exhaust passage means comprises an elongate section into which solid comminuted particulates are fed for said entrainment and dissemination 6. The structure in claim 2, wherein:

said exhaust passage means comprises heat-exchange means through which water is flowed while hot exhaust gas passes through said passage, to provide a continuous supply of heated water.

7. The structure in claim 2, wherein:

said exhaust passage means comprises a flexible duct for directing hot gas to desired locations spaced apart from said system.

8. The structure in claim 2, further including:

nozzle means connected to said air compression means for diverting a portion of said pressurized air to other uses including dust entrainment to create a dust cloud simultaneously with dispersion of said obscurement agents.

* * * * *